(12) United States Patent
Seo et al.

(10) Patent No.: US 9,300,424 B2
(45) Date of Patent: Mar. 29, 2016

(54) METHOD AND APPARATUS FOR TRANSMITTING/RECEIVING SIGNALS WITH A TERMINAL IN TDD WIRELESS COMMUNICATION SYSTEM

(75) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 14/110,093

(22) PCT Filed: Apr. 9, 2012

(86) PCT No.: PCT/KR2012/002663
§ 371 (c)(1),
(2), (4) Date: Dec. 9, 2013

(87) PCT Pub. No.: WO2012/138197
PCT Pub. Date: Oct. 11, 2012

(65) Prior Publication Data
US 2014/0086116 A1    Mar. 27, 2014

Related U.S. Application Data

(60) Provisional application No. 61/473,161, filed on Apr. 8, 2011.

(51) Int. Cl.
*H04J 3/00* (2006.01)
*H04J 3/16* (2006.01)
*H04W 72/14* (2009.01)
*H04L 5/00* (2006.01)
*H04J 11/00* (2006.01)
*H04W 56/00* (2009.01)

(52) U.S. Cl.
CPC ............. *H04J 3/1694* (2013.01); *H04J 11/003* (2013.01); *H04L 5/0007* (2013.01); *H04W 72/14* (2013.01); *H04W 56/0045* (2013.01)

(58) Field of Classification Search
CPC ............. H04W 56/0045; H04W 72/1278; H04W 72/1284; H04W 72/1289; H04W 72/1294; H04W 72/14
USPC .................................................. 370/329–342
See application file for complete search history.

(56) References Cited

U.S. PATENT DOCUMENTS 8,848,623 B2 * 9/2014 Cai et al. ............... 370/329
2009/0122771 A1 * 5/2009 Cai ........................ 370/338
(Continued)

FOREIGN PATENT DOCUMENTS

JP          2006-081217 A     3/2006
KR      1020090095592 A      9/2009
(Continued)

*Primary Examiner* — Kan Yuen
(74) *Attorney, Agent, or Firm* — Dentons US LLP

(57) ABSTRACT

Provided are a method and apparatus for transmitting/receiving signals with a terminal in a time division duplex (TDD) system. The method comprises: a scheduling information and pattern information receiving step, wherein a second subframe is scheduled within a first subframe; and a step for transmitting/receiving signals with a base station from the second subframe, wherein the second subframe is used as a downlink subframe if scheduling information is a downlink grant which schedules a downlink data channel, the second subframe is used as an uplink subframe if scheduling information is an uplink grant which schedules an uplink data channel, and the pattern information is information indicating positions of time gaps to prevent interference in the second subframe.

12 Claims, 12 Drawing Sheets

(56) References Cited

U.S. PATENT DOCUMENTS

2009/0318089 A1* 12/2009 Stratford et al. ........... 455/67.11
2011/0176461 A1* 7/2011 Astely et al. ................. 370/280
2011/0292854 A1* 12/2011 Terry et al. .................... 370/311

FOREIGN PATENT DOCUMENTS

KR 1020090101406 A 9/2009
WO 2009022295 A2 2/2009

* cited by examiner

METHOD AND APPARATUS FOR TRANSMITTING/RECEIVING SIGNALS WITH A TERMINAL IN TDD WIRELESS COMMUNICATION SYSTEM

This application is a 35 USC §371 National Stage entry of International Application No. PCT/KR 2012/002663 filed on Apr. 9, 2012, and claims priority of U.S. Provisional Application No. 61/473,161 filed on Apr. 8, 2011, each of which is hereby incorporated by reference in its entirety.

BACKGROUND OF THE INVENTION

1. Field of the Invention

The present invention relates to wireless communications, and more specifically, to a method and apparatus of a terminal transmitting and receiving a signal in a TDD (Time Division Duplex) system.

2. Related Art

3GPP (3rd Generation Partnership Project) TS (Technical Specification) Release-8-based LTE (long term evolution) is a prevailing next-generation mobile communication standard.

As disclosed in 3GPP TS 36.211 V8.7.0 (2009-05) "Evolved Universal Terrestrial Radio Access (E-UTRA); Physical Channels and Modulation (Release 8)," the physical channel in LTE may be divided into downlink channels, such as PDSCH (Physical Downlink Shared Channel) and PDCCH (Physical Downlink Control Channel), and uplink channels, such as PUSCH (Physical Uplink Shared Channel) and PUCCH (Physical Uplink Control Channel).

The PUCCH is an uplink control channel used for transmitting uplink control information such as HARQ (hybrid automatic repeat request) ACK/NACK (acknowledgement/not-acknowledgement) signal, CQI (Channel Quality Indicator), and SR (scheduling request).

Meanwhile, mobile communication systems include a TDD (Time Division Duplex) system and an FDD (frequency Division Duplex) system.

The TDD system uses the same frequency on both downlink and uplink, and the FDD system uses different frequencies on downlink and uplink, respectively.

Conventionally, a frame, in the TDD system, is configured to have an uplink subframe, a downlink subframe, and a special subframe through an upper layer signal. However, such scheme requires a high time delay in configuring or reconfiguring a subframe, and when traffic on downlink and uplink varies dynamically, this scheme thus has a difficulty in efficiently allocating resources.

Further, the TDD system, in case the subframes in the frame are configured in the order of a downlink subframe and an uplink subframe, needs a special subframe between the downlink subframe and the uplink subframe. A terminal sends out an uplink signal a TA (timing advanced) value earlier than a subframe boundary in the uplink subframe. Such uplink signal may act as interference in receiving a downlink signal. Accordingly, a special subframe including a time gap is disposed between the downlink subframe and the uplink subframe.

The TDD system needs a method of being able to prevent resource waste that may occur due to a special subframe while dynamically performing a configuration of subframes in a frame.

SUMMARY OF THE INVENTION

A technical object of the present invention is to provide a method and apparatus of transmitting and receiving a signal, which may prevent resource waste while dynamically configuring subframes in a TDD system.

In an aspect, a method of a terminal transmitting and receiving a signal in a TDD (time division duplex) system is provided. The method comprises receiving scheduling information for scheduling a second subframe in a first subframe and transmitting or receiving a signal to/from a base station in the second subframe, wherein in a case where the scheduling information is a downlink grant for scheduling a downlink data channel, the second subframe is used as a downlink subframe, and in a case where the scheduling information is an uplink grant for scheduling an uplink data channel, the second subframe is used as an uplink subframe.

The method may further comprise receiving type information, wherein the type information is information indicating whether a time gap for preventing interference is positioned in the second subframe and may inform the terminal of a switch between downlink reception and uplink transmission.

The type information may be included in the scheduling information and may be received.

In a case where the second subframe is used as the downlink subframe, and a subframe subsequent to the second subframe is set as the uplink subframe, the time gap may include a last OFDM (orthogonal frequency division multiplexing) symbol of the second subframe.

In a case where the second subframe is used as the downlink subframe, and a subframe positioned ahead of the second subframe is set as the uplink subframe, the time gap may include a first OFDM (orthogonal frequency division multiplexing) symbol of the second subframe.

The time gap may be determined on a per-OFDM symbol basis or on a per-multiple OFDM symbols basis.

The method may further comprise receiving flexible subframe configuration information indicating a flexible subframe in a TDD frame, wherein the flexible subframe configuration information indicates that the second subframe is the flexible subframe.

Flexible subframes indicated by the flexible subframe configuration information each may include a time gap.

The flexible subframe configuration information may be received through an RRC (radio resource control) message.

The scheduling information may be received through a PDCCH (physical downlink control channel) of the first subframe.

The method may further comprise receiving a TA (timing advanced) command from the base station, wherein the TA command indicates a time period before which the terminal should transmit an uplink signal with respect to an uplink subframe boundary.

In a case where the second subframe is used as the uplink subframe, a PUSCH (physical uplink shared channel) transmitted in the second subframe may be transmitted earlier than the second subframe boundary by a time period indicated by the TA command, and when transmitted, the PUSCH may be punctured by a time gap applied to the second subframe or rate matched.

The time gap applied to the second subframe may be larger than a time period indicated by the TA command.

In a case where the second subframe is used as the downlink subframe, the terminal might not receive a PDSCH (physical downlink shared channel) in a resource region corresponding to a time gap applied to the second subframe.

In another aspect, a terminal comprises an RF (radio frequency) unit transmitting and receiving a wireless signal and a processor connected to the RF unit, wherein the processor receives type information and scheduling information for scheduling a second subframe in a first subframe and transmits or receives a signal to/from a base station in the second subframe, wherein in a case where the scheduling information is a downlink grant for scheduling a downlink data channel, the processor uses the second subframe as a downlink subframe, and in a case where the scheduling information is an uplink grant for scheduling an uplink data channel, the processor uses the second subframe as an uplink subframe, and wherein the type information is information indicating whether a time gap for preventing interference is positioned in the second subframe.

In the TDD system, subframes may be dynamically configured in a frame. Accordingly, the resource allocation efficiency is increased. Further, resource waste and scheduling restriction that occur due to a special subframe may be removed.

DESCRIPTION OF EXEMPLARY EMBODIMENTS

Figure 1:
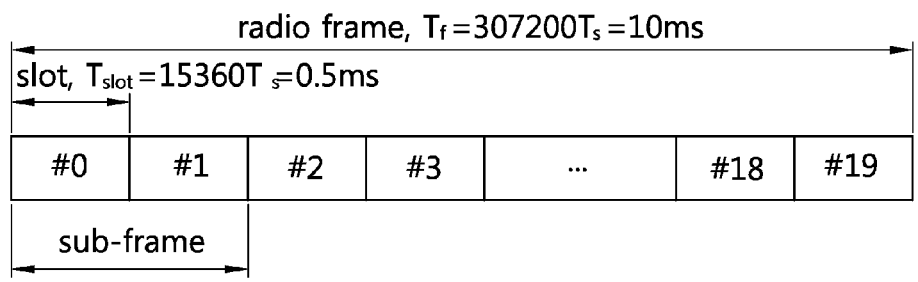
FIG. 1 illustrates a structure of an FDD radio frame.

The terminal (User Equipment, UE) may be stationary or mobile and may be referred to as an MS (mobile station), an MT (mobile terminal), a UT (user terminal), an SS (subscriber station), a wireless device, a PDA (personal digital assistant), a wireless modem, or a handheld device.

The base station generally refers to a fixed station that communicates with the terminal and may be referred to as an eNB (evolved-NodeB), a BTS (Base Transceiver System), or an access point.

Communication from the base station to the terminal is denoted as downlink (DL), and communication from the terminal to the base station is denoted as uplink (UL). A wireless communication system including the base station and the terminal may be a TDD (time division duplex) system or an FDD (frequency division duplex) system. The TDD system is a wireless communication system that uses different times in the same frequency band to perform uplink and downlink transmission/reception. The FDD system is a wireless communication system that may simultaneously perform uplink and downlink transmission/reception using different frequency bands. A wireless communication system may perform communication using a radio frame.

The wireless communication system may use an orthogonal frequency division multiplexing (OFDM) scheme. The OFDM converts data serially input into N pieces of parallel data and transmits the N pieces of parallel data over N orthogonal sub-carriers. The sub-carriers maintain orthogonality in light of frequency. The orthogonal frequency division multiple access (OFDMA) refers to a multiple access scheme in which in a system of using OFDM as its modulation scheme, some of the available sub-carriers are independently provided to each user so as to achieve multiple access.

A main problem with the OFDM/OFDMA system is that the PAPR (Peak-to-Average Power Ratio) may be very large. The problem with the PAPR is that the peak amplitude of a transmission signal is sharply higher than an average amplitude and comes from the fact that the OFDM symbol is an overlap of N sinusoidal signals over different sub-carriers. The PAPR, in connection with the capacity of battery, is problematic particularly for a terminal sensitive to power consumption. Accordingly, the OFDM/OFDMA is used for the base station's transmission. The single carrier-frequency division multiple access (SC-FDMA) may be used for the terminal's transmission.

The SC-FDMA has been suggested to reduce the PAPR and is a combination of the SC-FDE (Single Carrier-Frequency Division Equalization) and the FDMA (Frequency Division Multiple Access). As is well known, the SC-FDMA means a transmission scheme in which after DFT spreading, an IFFT (Inverse Fast Fourier Transform) is conducted. The SC-FDMA is similar to the OFDMA in that data is modulated and demodulated in the time domain and frequency domain. However, the SC-FDMA is advantageous in saving transmission power because it adopts the DFT (Discrete Fourier Transform) and thus the PAPR of a transmission signal is low. In connection with use of a battery, it is particularly beneficial to the uplink on which communication is performed from a terminal that is sensitive to transmission power to a base station.

FIG. 1 illustrates a structure of an FDD radio frame.

The FDD radio frame (hereinafter, shortly referred to as FDD frame) includes 10 subframes, and one subframe includes two consecutive slots. The slots included in the FDD frame are marked with indexes 0 to 19. The time taken for one subframe to be transmitted is a TTI (transmission time interval) and the TTI may be a minimum scheduling unit. For example, the length of one subframe may be 1 ms, and the length of one slot may be 0.5 ms.

Figure 2:
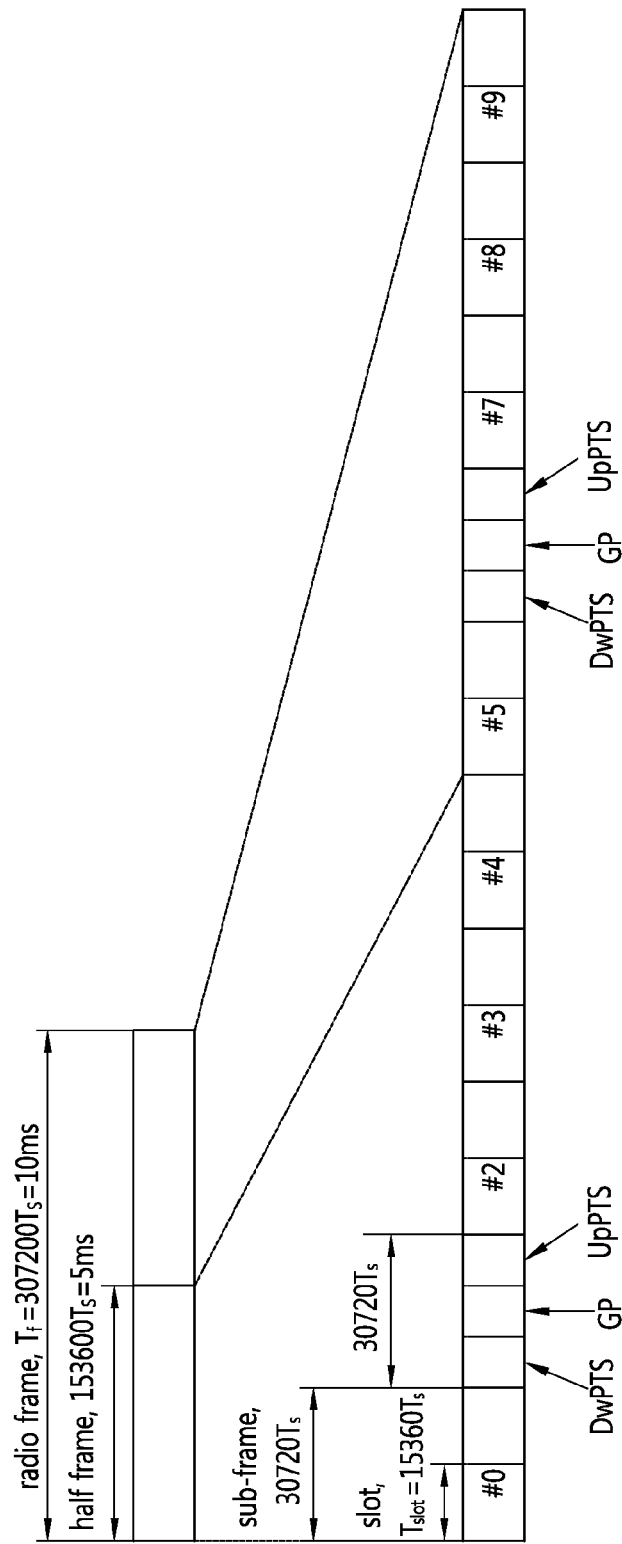
FIG. 2 illustrates a structure of a TDD radio frame.

FIG. 2 illustrates a structure of a TDD radio frame.

Referring to FIG. 2, when the subframes of the TDD radio frame (hereinafter, "TDD frame") start to be indexed from 0, the subframes having index #1 and index #6 are special subframes (shortly referred to as S subframe), and the S subframe includes a DwPTS (Downlink Pilot Time Slot: DwPTS), a GP (Guard Period) and an UpPTS (Uplink Pilot Time Slot). The DwPTS is used for initial cell search, sync, or channel estimation in the terminal. The UpPTS is used for channel estimation and uplink transmission syncing of the terminal in the base station. The GP is a period for removing interference that occurs in the uplink due to a multi-path delay of a downlink signal between the uplink and the downlink. The GP and the UpPTS serve as time gaps.

In the TDD frame, a DL (downlink) subframe and an UL (uplink) subframe co-exist. Table 1 shows an example of a UL-DL configuration of a radio frame:

TABLE 1

| Uplink-downlink configuration | Downlink-to-Uplink Switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D,' 'U,' and 'S' respectively indicate a DL subframe, an UL subframe, and a special subframe, respectively. When receiving the UL-DL configuration from the base station, the terminal may be aware of whether each subframe in the TDD frame is a DL subframe or an UL subframe. Hereinafter, Table 1 may be referred to for the UL-DL configuration N (N is one of 0 to 6).

Figure 3:
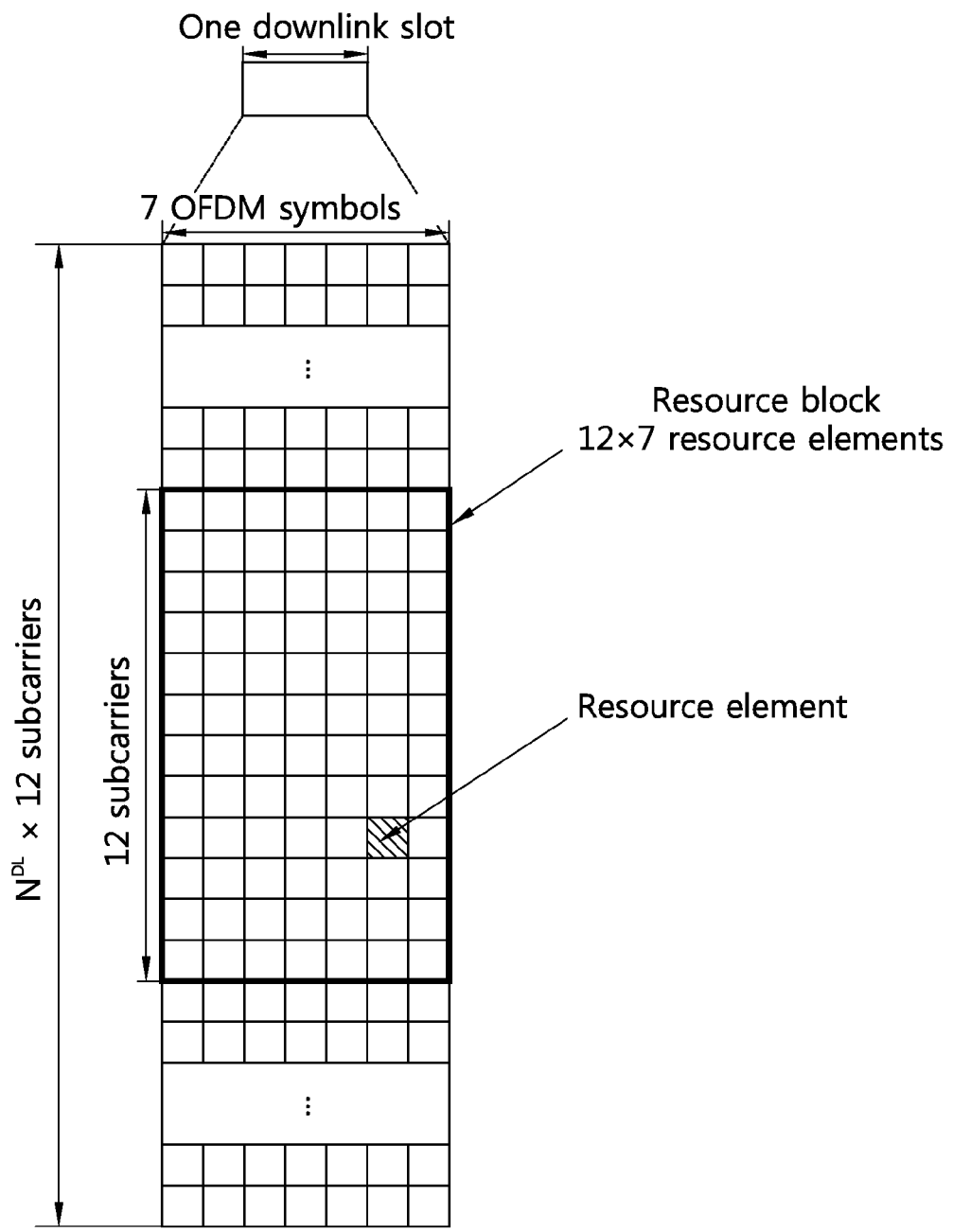
FIG. 3 illustrates an example of a resource grid for one downlink slot.

FIG. 3 illustrates an example of a resource grid for one downlink slot.

Referring to FIG. 3, the downlink slot includes a plurality of OFDM (orthogonal frequency division multiplexing) symbols in the time domain and includes $N_{RB}$ resource blocks (RBs) in the frequency domain. The OFDM symbol denotes a time unit or a symbol period in the slot or subframe and may be referred to by other terms depending on transmission schemes. For example, in case the OFDMA is used for downlink, it may be referred to as an OFDMA symbol, and in case the SC-FDMA is used for uplink, the OFDM symbol may be referred to as an SC-FDMA symbol. Hereinafter, the OFDM symbol, the OFDMA symbol, and the SC-FDMA symbol are collectively referred to as OFDM symbol, for ease of description. The resource block is a basis for allocating resources, and it includes one slot in the time domain and a plurality of consecutive sub-carriers in the frequency domain. The number $N_{RB}$ of the resource blocks in the downlink slot depends on the downlink transmission bandwidth $N^{DL}$ that is set in a cell. For example, in the LTE system, $N_{RB}$ may be one of 6 to 110. The structure of the uplink slot may be the same as the structure of the downlink slot.

Each element on the resource grid is referred to as a resource element (RE). The resource element on the resource grid may be identified by an index pair (k,l) in the slot. Here, $k(k=0, \ldots, N_{RB} \times 12-1)$ is a sub-carrier index in the frequency domain, and $l(l=0, \ldots, 6)$ is an OFDM symbol index in the time domain.

Although in FIG. 3 one resource block consists of seven OFDM symbols in the time domain and twelve sub-carriers in the frequency domain so that the resource block includes 7×12 resource elements, by way of example, the number of OFDM symbols and the number of sub-carriers in the resource block are not limited thereto. The number of OFDM symbols and the number of sub-carriers may vary depending on the length of CP or frequency spacing. For example, in case the length of a CP (cyclic prefix) is an extended CP, the resource block includes six OFDM symbols. The number of sub-carriers in one OFDM symbol may be picked up among 128, 256, 512, 1024, 1536, and 2048.

Figure 4:
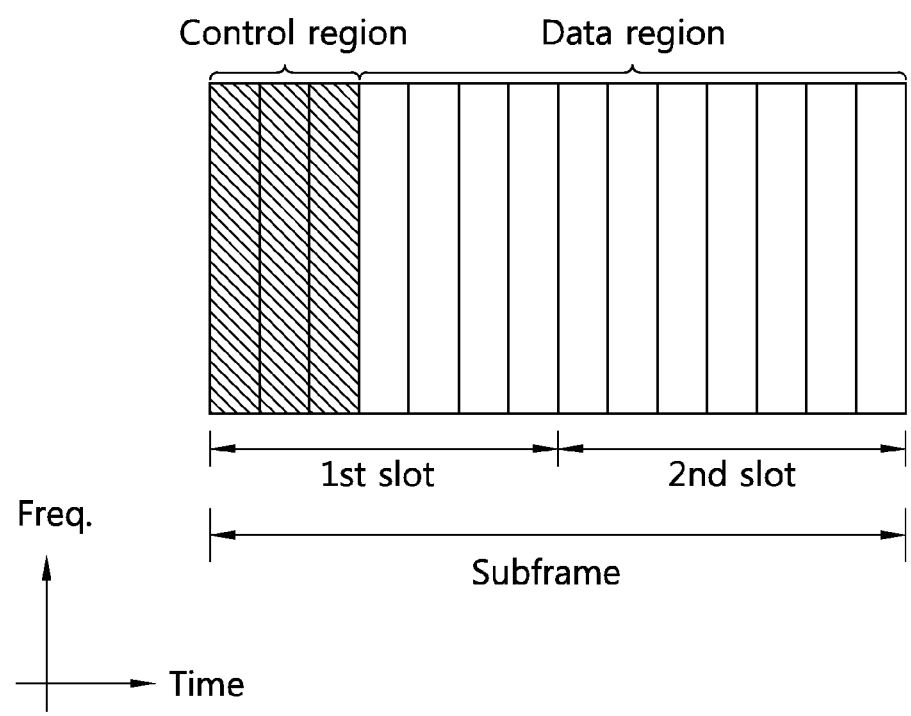
FIG. 4 illustrates a structure of a downlink (DL) subframe.

FIG. 4 illustrates a structure of a downlink (DL) subframe.

Referring to FIG. 4, the DL (downlink) subframe is divided into a control region and a data region in the time domain. The control region includes up to first three (in some cases up to four) OFDM symbols of the first slot in the subframe. However, the number of OFDM symbols included in the control region may be changed. A PDCCH (physical downlink control channel) and other control channels are allocated to the control region, and a PDSCH (physical downlink shared channel) is allocated to the data region.

As disclosed in 3GPP TS 36.211 V8.7.0, the physical channels in the 3GPP LTE may be classified into data channels, such as PDSCH (Physical Downlink Shared Channel) and PUSCH (Physical Uplink Shared Channel), and control channels, such as PDCCH (Physical Downlink Control Channel), PCFICH (Physical Control Format Indicator Channel), PHICH (Physical Hybrid-ARQ Indicator Channel), and PUCCH (Physical Uplink Control Channel).

The PCFICH transmitted in the first OFDM symbol of the subframe carries a CFI (control format indicator) regarding the number of OFDM symbols (that is, size of the control region) used for transmission of control channels in the subframe. The terminal receives the CFI on the PCFICH and then monitors the PDCCH. Unlike the PDCCH, the PCFICH is transmitted through a fixed PCFICH resource of the subframe without using blind decoding.

The PHICH carries an ACK (positive-acknowledgement)/NACK (negative-acknowledgement) signal for an uplink HARQ (hybrid automatic repeat request). The ACK/NACK signal for UL (uplink) data on the PUSCH transmitted by the terminal is transmitted on the PHICH.

The PBCH (Physical Broadcast Channel) is transmitted in the first four OFDM symbols of the second slot in the first subframe. The PBCH carries system information necessary for the terminal to communicate with the base station, and the system information transmitted through the PBCH is referred to as an MIB (master information block). By comparison, the system information transmitted on the PDSCH as indicated by the PDCCH is denoted as an SIB (system information block).

The control information transmitted through the PDCCH is referred to as downlink control information (DCI). The DCI may include resource allocation of the PDSCH (which is also referred to as DL (downlink) grant), resource allocation of the PUSCH (which is also referred to as UL (uplink) grant), a set of transmission power control commands for individual UEs in any UE group and/or activation of VoIP (Voice over Internet Protocol).

Figure 5:
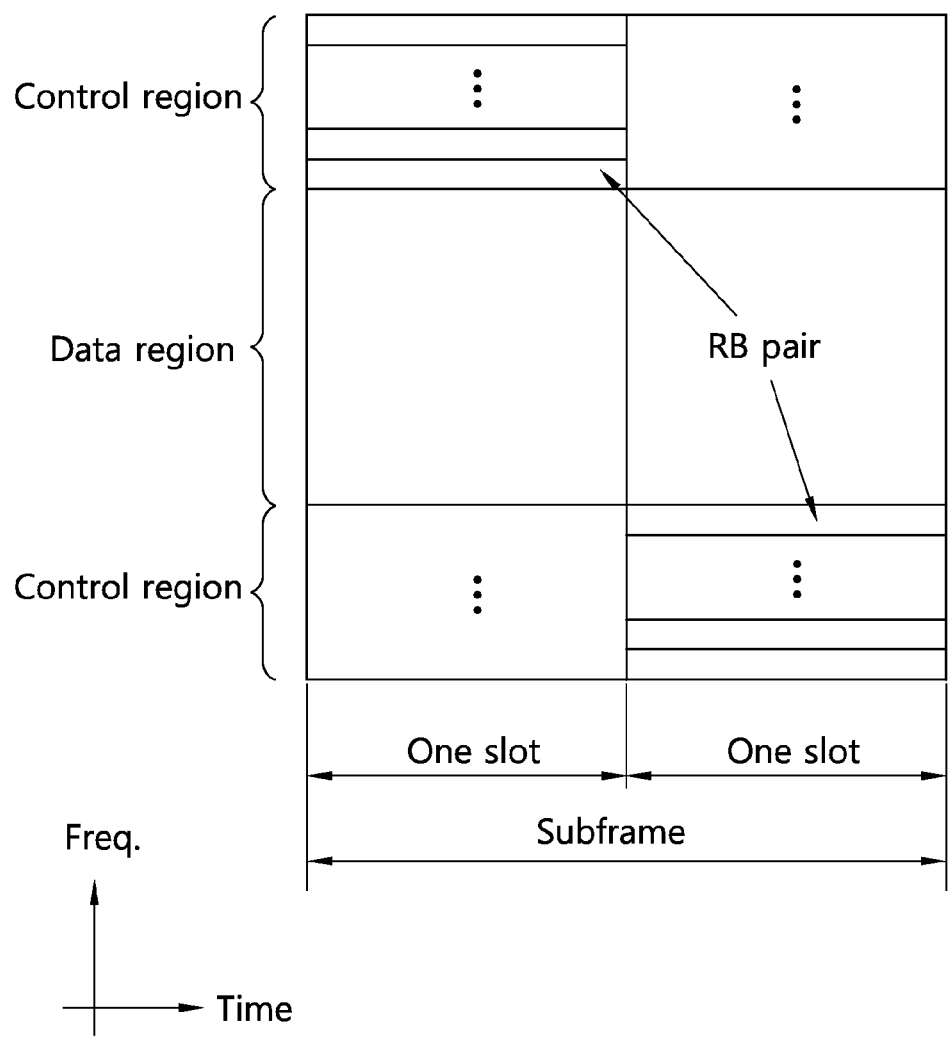
FIG. 5 illustrates a structure of an uplink subframe.

FIG. 5 illustrates a structure of an uplink subframe.

Referring to FIG. 5, the uplink subframe may be divided into a control region in which a PUCCH (Physical Uplink Control Channel) for carrying uplink control information is allocated in the frequency domain and a data region in which a PUSCH (Physical Uplink Shared Channel) for carrying user data is allocated.

The PUCCH is allocated in an RB pair in the subframe. The RBs in the RB pair occupy different sub-carriers in the first slot and second slot. The RB pair has the same resource block index m.

According to 3GPP TS 36.211 V8.7.0, the PUCCH supports multiple formats. Depending on the modulation scheme dependent upon the PUCCH format, PUCCHs having different numbers of bits per subframe may be used.

The following Table 2 shows modulation schemes according to PUCCH formats and the number of bits per subframe.

TABLE 2

| PUCCH format | modulation scheme | number of bits per subframe |
|---|---|---|
| 1 | N/A | N/A |
| 1a | BPSK | 1 |

TABLE 2-continued

| PUCCH format | modulation scheme | number of bits per subframe |
| --- | --- | --- |
| 1b | QPSK | 2 |
| 2 | QPSK | 20 |
| 2a | QPSK + BPSK | 21 |
| 2b | QPSK + QPSK | 22 |

PUCCH format 1 is used for transmitting an SR (Scheduling Request), PUCCH formats 1a/1b are used for transmitting an ACK/NACK signal for an HARQ, PUCCH format 2 is used for transmitting CQI, and PUCCH formats 2a/2b are used for simultaneously transmitting the CQI and ACK/NACK signal. When only the ACK/NACK signal is transmitted in the subframe, PUCCH formats 1a/1b are used, and when the SR alone is transmitted, PUCCH format 1 is used. When the SR and ACK/NACK are simultaneously transmitted, PUCCH format 1 is used, and the ACK/NACK signal is modulated in the resource allocated to the SR and is transmitted.

Each of the PUCCH formats uses cyclic shift (CS) of a sequence in each OFDM symbol. The sequence cyclic-shifted is generated by cyclic shifting a base sequence by a specific CS (cyclic shift) amount. The specific CS amount is indicated by the cyclic shift index.

The base sequence $r_u(n)$, by way of example, is defined as follows:

$$r_u(n) = e^{jb(n)\pi/4} \quad \text{[Equation 1]}$$

Here, u is a root index, and n is an element index. $0 \le n \le N-1$, where N is the length of the base sequence. b(n) is defined in section. 5.5., 3GPP TS 36.211 V8.7.0.

The length of the sequence is the same as the number of elements included in the sequence. u may be defined by a cell ID (Identifier) or a slot number in the radio frame. When the base sequence is mapped to one resource block in the frequency domain, since one resource block includes twelve sub-carriers, the length N of the base sequence is 12. A different base sequence is defined according to a different root index.

The base sequence, r(n), may be cyclic-shifted as shown in Equation 2 below, thereby obtaining a cyclic-shifted sequence $r(n, I_{cs})$.

$$r(n, I_{cs}) = r(n) \cdot \exp\left(\frac{j2\pi I_{cs} n}{N}\right), \quad \text{[Equation 2]}$$
$$0 \le I_{cs} \le N - 1$$

Here, $I_{cs}$ is a cyclic shifted index that represents the amount of CS ($0 \le I_{cs} < N-1$).

The available cyclic shifted index of the base sequence refers to a cyclic shifted index that may be derived from the base sequence according to a CS interval. For example, if the length of the base sequence is 12, and the CS interval is 1, the total number of available cyclic shifted indexes of the base sequence is 12. Or, if the length of the base sequence is 12, and the CS interval is 2, the total number of available cyclic shifted indexes of the base sequence is 6.

Hereinafter, the present invention is described.

In an existing wireless communication system, for example, a 3GPP LTE (3rd generation partnership project long term evolution, hereinafter "LTE") system, an FDD frame used in an FDD system and a TDD frame used in a TDD system co-exist. The FDD frame has subframes that always exist at 1:1 at the same time on uplink and downlink. In contrast, the ratio in subframes between uplink and downlink is not always 1:1 in the TDD frame. That is, the ration of downlink subframes to uplink subframes varies depending on UL-DL configurations. Accordingly, in case the TDD frame is used, if traffic on uplink and downlink is not drastically changed, a UL-DL configuration having many downlink subframes or having many uplink subframes is used depending on traffic, thereby resulting in efficient use of frequency resources.

In the TDD system, however, the UL-DL configuration is made not dynamically but semi-statically through an upper layer signal. That is, a considerable time delay exists in UL-DL configuration and re-configuration, and in case there is a HARQ (hybrid automatic repeat request) process that is already in progress, the HARQ process should be stopped or its termination should be awaited. Accordingly, in case uplink and downlink traffic is sharply changed, it is difficult to adaptively change the UL-DL configuration, so that wireless resources might not be efficiently used.

Therefore, a method is suggested herein of being able to dynamically configure whether to apply UL/DL of the subframe in the TDD frame.

The base station may set all or some of the subframes in the TDD frame as flexible subframes. The flexible subframes denote subframes that may be flexibly set as uplink subframes or downlink subframes depending on scheduling information for scheduling the flexible subframes.

Whether a specific subframe in the frame is a flexible subframe may be indicated by flexible subframe configuration information. The flexible subframe configuration information may indicate whether each subframe in one frame or a plurality of frames is a flexible subframe in the form of a bitmap. Or the flexible subframe configuration information may also indicate whether each subframe in such a manner as to indicate a specific index of a predetermined table between the terminal and the base station. The flexible subframe configuration information may be delivered to the terminal through an upper layer signal such as an RRC message or system information.

Thereafter, the base station may indicate a specific transmission direction of the flexible subframe, i.e., whether it is used as a DL subframe or an UL subframe based on the scheduling information for scheduling the flexible subframe.

For example, assume that scheduling information for scheduling subframe m is transmitted in subframe n and that subframe m is set as a flexible subframe. At this time, in case a DL grant is included in a PDCCH that is transmitted in subframe n, subframe m is set as a DL subframe. In contrast, in case a UL grant is included in a PDCCH transmitted in subframe m, subframe m is set as a UL subframe. Subframe n and subframe m may be different from each other.

Such a method may be used to set a specific subframe in a TDD frame as a UL subframe or a DL subframe, but is not limited thereto. For example, it may also be used for a terminal operating in half duplex in an FDD system using an FDD frame. The terminal operating in half duplex means a terminal that may perform only one of uplink transmission and downlink reception at a specific time. The FDD system uses different frequency resources for downlink subframes and uplink subframes and thus even when simultaneously performing uplink transmission and downlink reception, no interference occurs theoretically. However, in case a terminal, like a half duplex terminal, has a single amplifier, the terminal may perform only one operation of uplink transmission and downlink reception. Accordingly, the half duplex terminal operates as if a specific subframe in the FDD frame is set and used as an uplink subframe or a downlink subframe. Accordingly, even when the terminal operating in half duplex operates in an FDD system, the present invention may apply.

Further, a method is suggested herein for removing resource waste and scheduling restriction that occur due to the configuration of an S subframe.

Referring to the UL-DL configuration shown in Table 1, in case in the TDD frame the subframes are switched in the order of a DL subframe and a UL subframe, it can be seen that an S subframe is present between the DL subframe and the UL subframe. As such, the reason why the S subframe is present is to prevent uplink transmission in the UL subframe of the terminal from acting as interference in downlink reception in the DL subframe.

That is, in the LTE, the base station transfers a TA (timing advanced) command to each terminal in order to sync PUSCH/PUCCH/SRS (sounding reference signal) received from multiple terminals. The terminal may recognize a frame and a subframe boundary based on the received sync signals. The TA command indicates how earlier an uplink signal should be transmitted from the terminal than a time period set as the UL subframe. In other words, it can be known through the TA command how earlier the uplink signal should be transmitted than the UL subframe boundary that is recognized through the sync signals. The terminal transmits the uplink signal earlier than the uplink subframe boundary by a time indicated by the TA, so that if the DL subframe is positioned immediately ahead of the uplink subframe, interference may occur when a downlink signal is received in the DL subframe. To prevent this, the S subframe is disposed. This may act as a limitation in scheduling in the TDD frame and may lower resource utilization efficiency.

Figure 6:
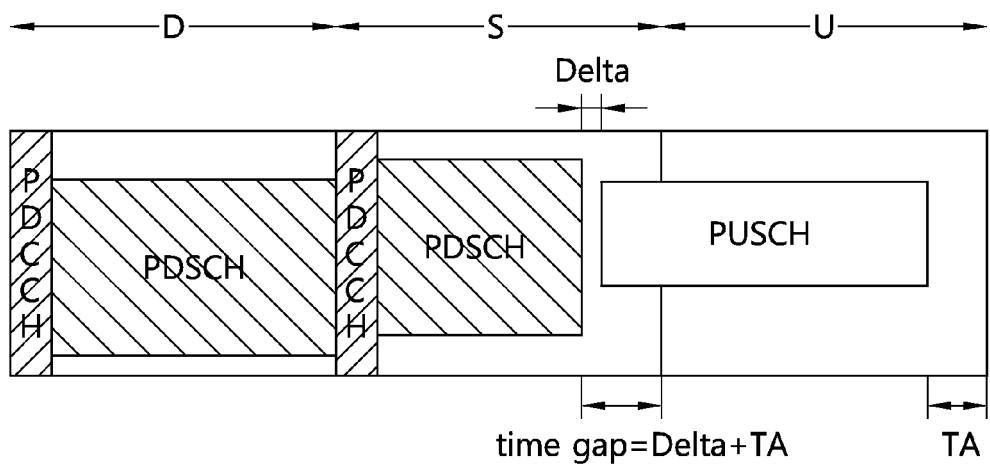
FIG. 6 illustrates an example in which a terminal performs uplink transmission in response to a TA command according to the prior art.

FIG. 6 illustrates an example in which a terminal performs uplink transmission in response to a TA command according to the prior art.

Referring to FIG. 6, in a TDD frame, subframes are set in the order of a DL subframe (denoted with D), an S subframe (denoted with S), and a UL subframe (denoted with U). In this case, the terminal transmits a PUSCH earlier than the UL subframe that serves as a boundary by a time period indicated by a TA command value.

If the DL subframe is positioned immediately ahead of the UL subframe, interference may be caused in reception of a PDSCH by PUSCH/PUCCH/SRS transmitted the TA command value earlier. To prevent this, an S subframe is positioned between the DL subframe and the UL subframe.

Conventionally, the S subframe may be in some cases used for PDSCH transmission by the base station. The PDSCH transmitted in the S subframe by the base station, unlike the PDSCH transmitted in the DL subframe, is punctured by a predetermined number of last OFDM symbols and is then transmitted. As shown in FIG. 6, the PDSCH is transmitted, cut off by a time gap in the S subframe. At this time, the time gap may be set to be larger than the above-described TA command value. Accordingly, such time gap prevents PDSCH reception from overlapping PUSCH transmission.

FIG. 6 illustrates the reason why the S subframe including the time gap is needed in the TDD frame. The time gap may be needed also in an FDD frame. As described above, the terminal operating in half duplex has only one amplifier and the terminal may thus perform only one operation of downlink reception and uplink transmission at a specific time. That is, the terminal cannot perform downlink reception and uplink transmission at the same time. In such case, the FDD system itself provides the downlink subframe and the uplink subframe always at 1:1 at the same time with frequency regions set different from each other, but the terminal may perform only one of the downlink reception and the uplink transmission at a specific time, so that it ends up operating similar to a TDD system. In case in the FDD frame the downlink reception period of the terminal overlaps the uplink transmission period, a time gap needs to be configured.

First, an applicable example of the present invention is described in which a plurality of consecutive subframes in the TDD frame are set as flexible subframes, and the plurality of consecutive subframes are set in the order of DL subframes and UL subframes.

Figure 7:
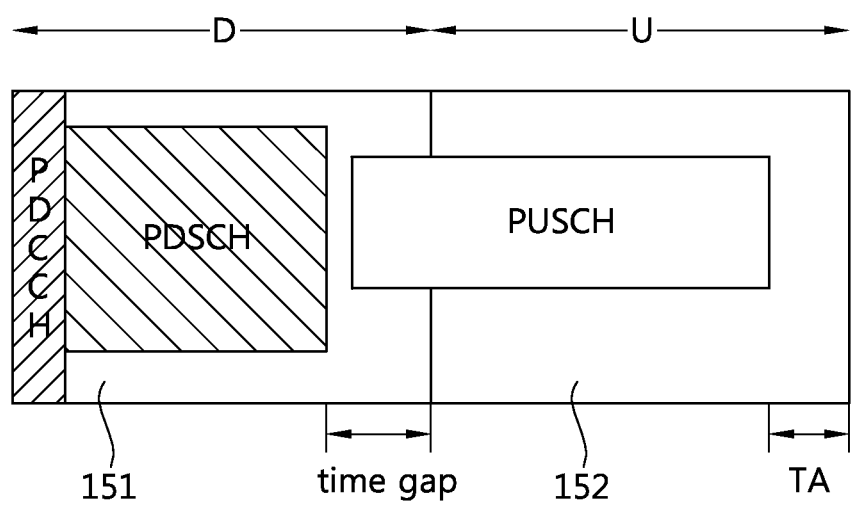
FIG. 7 illustrates an example of configuring a time gap when two consecutive flexible subframes are set in the order of a DL subframe and a UL subframe according to an embodiment of the present invention.

FIG. 7 illustrates an example of configuring a time gap when two consecutive flexible subframes are set in the order of a DL subframe and a UL subframe according to an embodiment of the present invention.

Referring to FIG. 7, the time gap may be configured in the last portion of the flexible subframe 151 set as a DL subframe. The time gap configured in the DL subframe is a time period for preventing interference that may occur between PDSCH reception in the DL subframe and PUSCH transmission in the UL subframe consecutive to the DL subframe. The base station does not transmit a PDSCH in the time gap of the DL subframe. That is, the PDSCH is punctured as much as the time gap or is rate matched, and is then transmitted. Further, the terminal might not perform PDSCH reception in the time gap. The time gap is equal to or larger than a TA command value that applies to the flexible subframe 152 set as a UL subframe.

A predetermined number of last OFDM symbols of the PDSCH transmitted in the flexible subframe 151 set as the DL subframe are not used.

Figure 8:
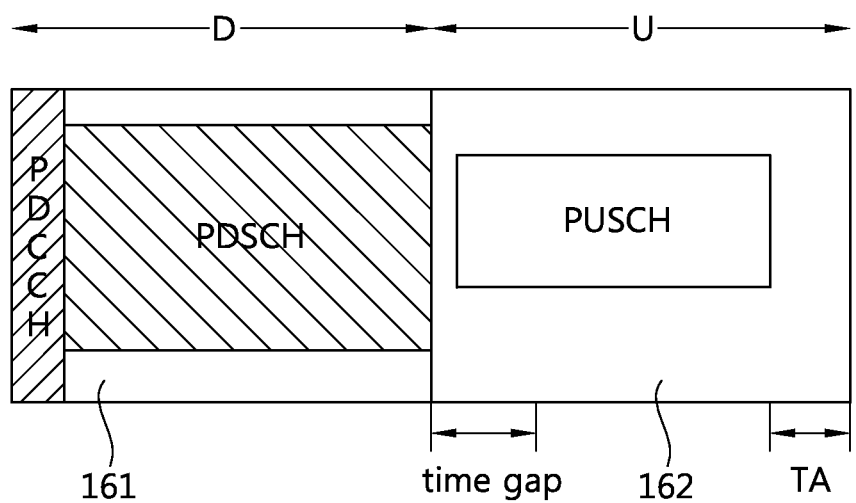
FIG. 8 illustrates an example of configuring a time gap when setting two consecutive flexible subframes in the order of a DL subframe and a UL subframe according to another embodiment of the present invention.

FIG. 8 illustrates an example of configuring a time gap when setting two consecutive flexible subframes in the order of a DL subframe and a UL subframe according to another embodiment of the present invention.

Referring to FIG. 8, the time gap is configured in a first portion of the flexible subframe 162 set as a UL subframe. That is, unlike FIG. 7, the number of OFDM symbols that may be used in the flexible subframe 162 set as the UL subframe may be reduced to secure a time gap. The time gap is equal to or larger than a time period indicated by a TA value. The time gap configured in the UL subframe is a time period for preventing interference from occurring between PDSCH reception in the DL subframe positioned right ahead of the UL subframe and PUSCH transmission in the UL subframe.

In such case, in the flexible subframe 162 set as the UL subframe, the number of OFDM symbols that may be used for PUSCH transmission may be reduced, but because the time gap is present in the flexible subframe 162, the structure of the flexible subframe 161 set as the DL subframe is the same as the structure of the existing DL subframe.

By configuring a time gap by the methods described in connection with FIGS. 7 and 8 according to the present invention, a need is eliminated for allocating an S subframe when setting flexible subframes in the order of DL subframes and UL subframes unlike the prior art in which an S subframe needs to be positioned between the DL subframe and the UL subframe. Accordingly, the degree of freedom for scheduling may be increased.

The time gap may be configured in the flexible subframe on a per-OFDM symbol basis or in some of the OFDM symbols. Even when some of the OFDM symbols are set as the time gap, all of the corresponding OFDM symbols may be punctured or rate matched upon data transmission/reception.

Which one of the methods described in connection with FIGS. 7 and 8 is to be used by the terminal may be determined depending on a setting of the base station.

According to another embodiment of the present invention, in case two consecutive flexible subframes are set in the order of a DL subframe and a UL subframe, time gaps are configured in a last portion of the flexible subframe 151 set as the DL subframe and in a first portion of the flexible subframe 162 set as the UL subframe, for example. By doing so, limitation in use of OFDM symbols biased towards one side may be distributed to both the DL subframe and the UL subframe.

A signaling process between a base station and a terminal is now described when the present invention applies.

Figure 9:
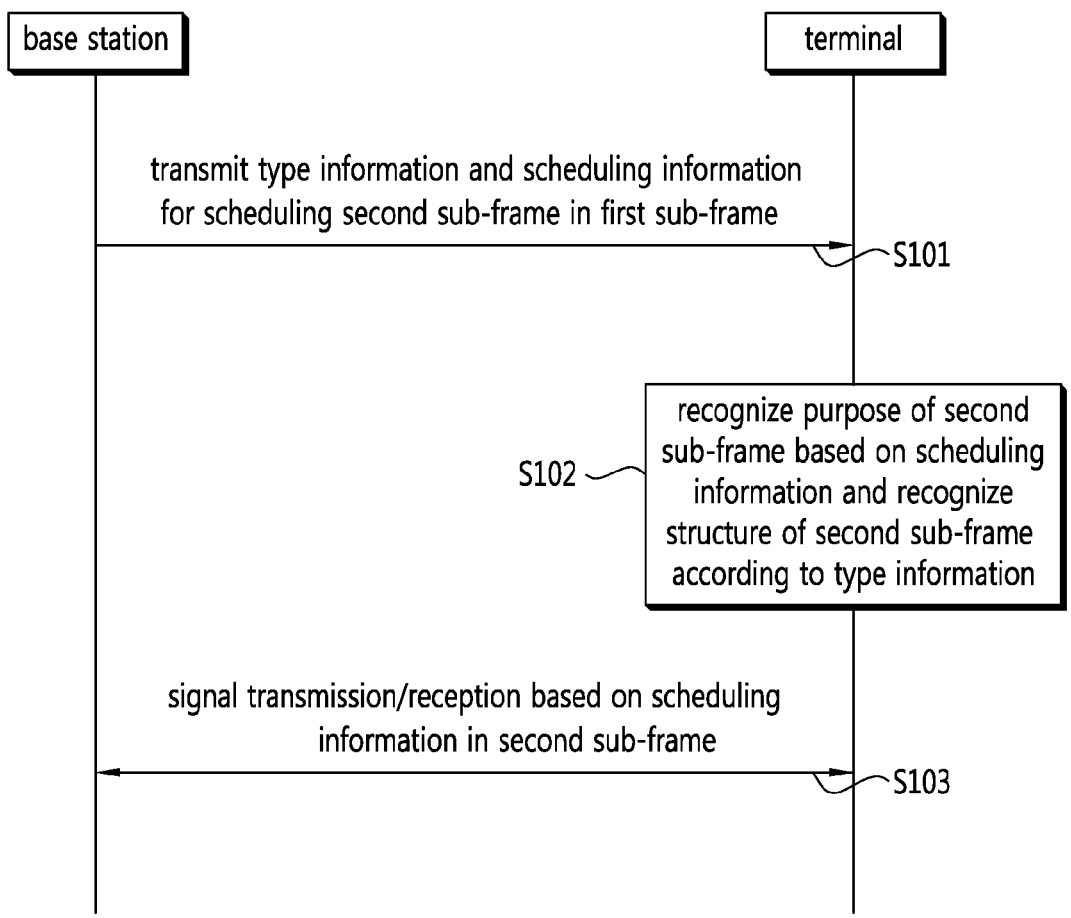
FIG. 9 illustrates a signaling process between a base station and a terminal according to an embodiment of the present invention.

FIG. 9 illustrates a signaling process between a base station and a terminal according to an embodiment of the present invention.

The base station transmits type information and scheduling information for scheduling a second subframe in a first subframe (S101). Assume here that the second subframe is set as a flexible subframe by flexible subframe configuration information. The type information indicates whether the second subframe includes a time gap. The type information may be separately signaled and may be included in the scheduling information for scheduling the second subframe as well. The first subframe and the second subframe may be the same or different from each other. For example, in case the scheduling information schedules a PDSCH, the first and second subframes are the same, and in case the scheduling information schedules a PUSCH, the first and second subframes may be different from each other.

The terminal recognizes the purpose of the second subframe based on the scheduling information, and according to the type information, recognizes the structure of the second subframe (S102). For example, in case scheduling information for scheduling the second subframe transmitted in the first subframe is a DL grant, the terminal may be aware that the second subframe is set as the DL subframe. Also, the terminal may be aware of whether a time gap is included in the second subframe in accordance with the type information included in the DL grant. In case the second subframe includes a time gap, FIG. 7 may be referred to for the structure of the subframe.

Or, in case the scheduling information for scheduling the second subframe is a UL grant, the terminal may be aware that the second subframe is set as the UL subframe, and according to the type information included in the UL grant, the terminal may be aware of whether the second subframe includes a time gap. In case the second subframe includes a time gap, FIG. 8 may be referred to for its structure.

The base station and the terminal transmit/receive signals therebetween based on the scheduling information in the second subframe (S103).

Although in FIG. 9 the type information is included in the scheduling information, the present invention is not limited thereto. For example, the scheduling information might not include the type information and may also directly indicate a value of the time gap through a specific field of the scheduling information.

Figure 10:
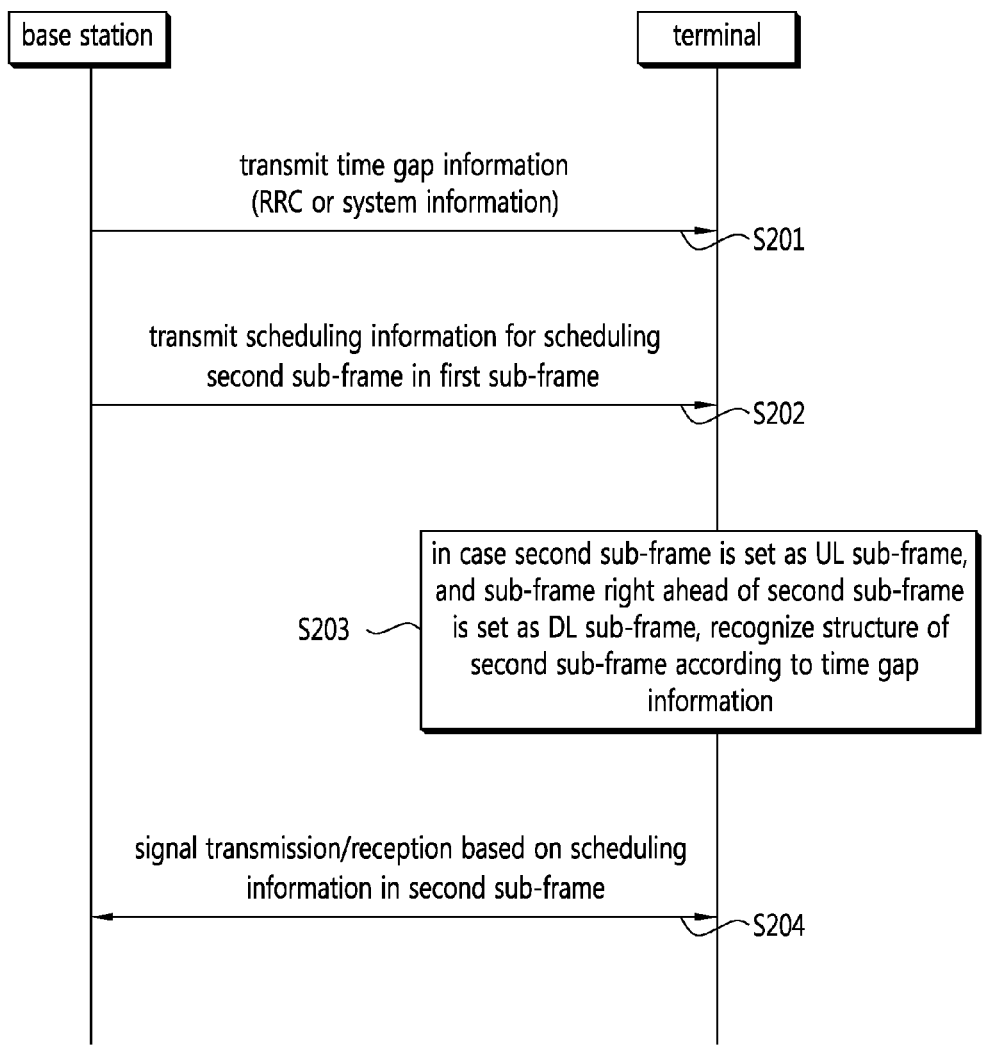
FIG. 10 illustrates a method by which a terminal operates according to another embodiment of the present invention.

FIG. 10 illustrates a method by which a terminal operates according to another embodiment of the present invention.

The base station transmits time gap information (S201). Here, the time gap information, in case a time gap is included in the flexible subframe, may be information indicating its time value. The base station may inform the time gap information terminal-specifically or cell-specifically through an upper layer signal such as, e.g., an RRC signal. Or, the base station may transmit the time gap information through system information that is broadcast.

The base station transmits scheduling information for scheduling the second subframe in the first subframe (S202).

The terminal, in case the second subframe is set as the UL subframe and the subframe immediately ahead of the second subframe is set as the DL subframe by the scheduling information, recognizes the structure of the second subframe by applying time gap information (S203). In other words, if the flexible subframe is set as the UL subframe, and the subframe right ahead of the flexible subframe is set as the DL subframe, the terminal recognizes the structure of the flexible subframe according to the previously received time gap information.

The base station and the terminal transmit and receive signals therebetween based on the scheduling information in the second subframe (S204).

Although in FIG. 10 the base station explicitly provides the time gap information, the present invention is not limited thereto. In other words, the time gap may be previously set as a specific value, and in such case, no time gap information may be needed.

Further, although in FIG. 9 the type information is transmitted to dynamically indicate whether a time gap is included in the flexible subframe, it may be previously determined to include time gaps in all of the flexible subframes in order to reduce load of signaling. At this time, no type information may be required.

An example is now described of applying different time gaps to multiple terminals, respectively.

Each terminal may have a TA command value depending on a distance from a base station and geographical characteristics. As described above, a time gap is needed to prevent advanced transmission of PUSCH/PUCCH/SRS due to the TA command value possessed by each terminal from colliding with reception in the previous DL subframe.

However, a method may be considered of letting the terminals have different time gaps for better use of resources.

Conventionally, in the LTE, a time gap of an S subframe has been configured considering a terminal positioned at a cell boundary, i.e., a terminal under the worst case. However, such may lead to resource waste. Accordingly, allowing each terminal to have a different time gap may result in more efficient use of resources.

For example, the base station configures a smaller time gap for a terminal having a smaller TA value so that the terminal may use more time resources, and the base station configures a larger time gap for a terminal having a larger TA value.

In particular, since the terminal operating in half duplex in the FDD system has a downlink frequency band separated from an uplink frequency band, the FDD system, unlike the TDD system, has no interference in downlink reception of the second terminal from uplink transmission of the first terminal. Accordingly, it is preferable to configure different time gaps depending on the TA value of each terminal.

Figure 11:
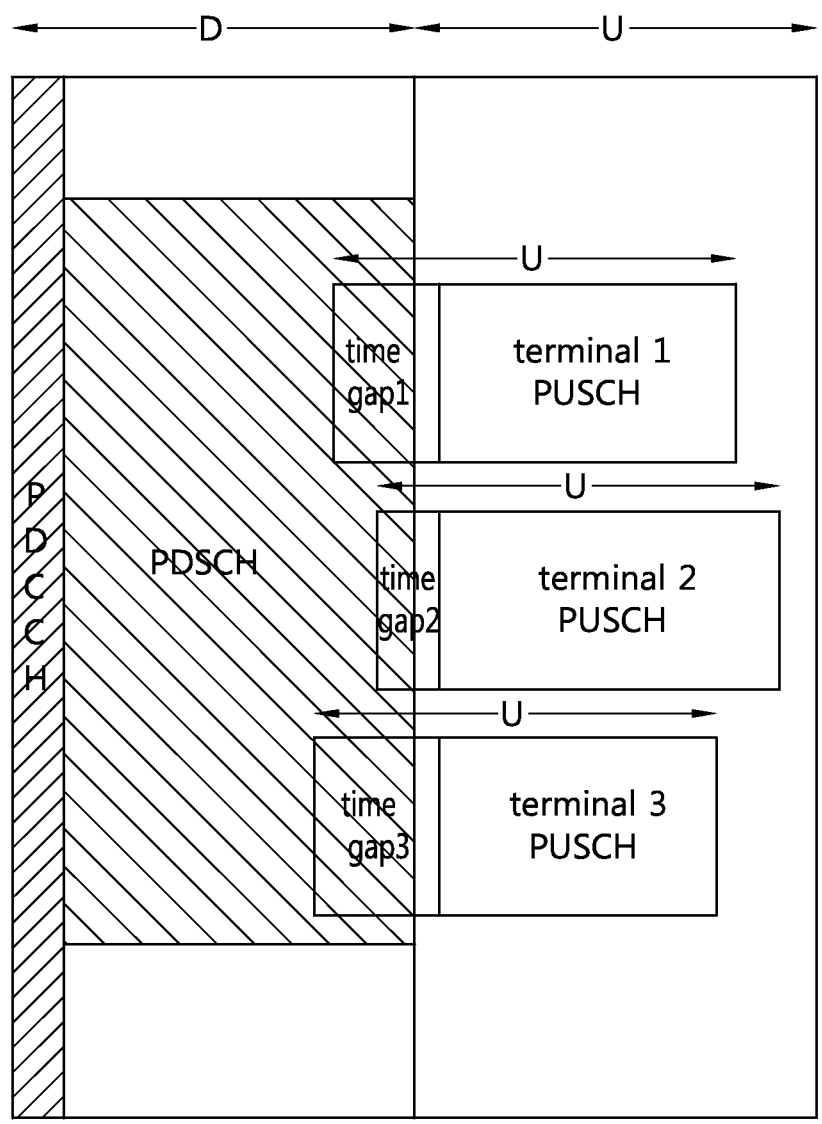
FIG. 11 illustrates an example in which a plurality of terminals have different time gaps from each other.

FIG. 11 illustrates an example in which a plurality of terminals have different time gaps from each other.

Referring to FIG. 11, terminal 1, terminal 2, and terminal 3 may operate in different frequency bands. The scheme described above in connection with FIG. 8 applies to terminal 1 and terminal 3, with different time gaps applied to the terminals, respectively. In other words, time gaps 1, 2, and 3 may have different values from each other. In FIG. 11, time gaps 1, 2, and 3 correspond to times of resource regions positioned ahead of the PUSCHs of the terminals.

The time gap applied to each terminal may be explicitly indicated or implicitly configured. For example, if the relationship between a time gap and a TA command value is previously designated, the time gap may be inferred from the TA command value.

For example, the TA command value may be set to be equal to the time gap or the sum of the TA command value and a predetermined value (e.g., a value necessary for switching between downlink reception and uplink transmission) may be set as the time gap.

The time gap may be configured on a per-number of OFDM symbols basis or on a per-multiple of the number of OFDM symbols basis. In such case, the minimum number of OFDM symbols having a larger time period than the TA command value may be set as the time gap.

The above-described methods may dynamically indicate whether a time gap is included in a flexible subframe for transmitting a PUSCH through a UL grant. However, in case re-transmission of the PUSCH is induced by a PHICH without PUCCH transmission or UL grant in the flexible subframe, the method of dynamically indicating whether a time gap is included is impossible. Accordingly, in case the PUSCH is re-transmitted by the PHICH without a UL grant or PUCCH transmission in a specific flexible subframe, transmission may be conducted with a time gap assumed to be configured all the time.

Figure 12:
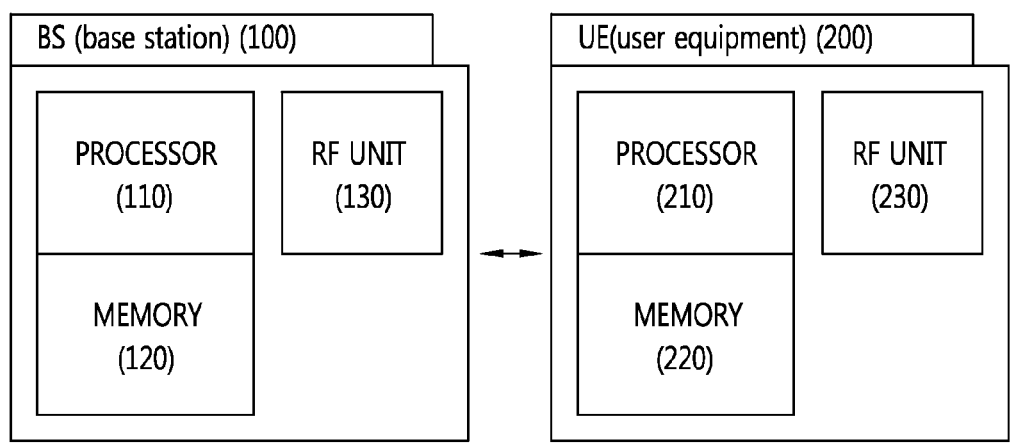
FIG. 12 is a block diagram illustrating a wireless device in which an embodiment of the present invention is implemented.

FIG. 12 is a block diagram illustrating a wireless device in which an embodiment of the present invention is implemented.

A base station 100 includes a processor 110, a memory 120, and an RF (radio frequency) unit 130. The processor 110 implements functions, processes, and/or methods suggested herein. For example, the processor 110 transmits flexible subframe configuration information. The flexible subframe configuration information is information indicating/setting a flexible subframe among subframes in a TDD frame. Further, the processor 110 transmits scheduling information for scheduling the flexible subframe, and upon transmission, may include type information in the scheduling information. The memory 120 is connected to the processor 110 and stores various information for driving the processor 110. The RF unit 130 is connected to the processor 110 and transmits and/or receives wireless signals.

A terminal 200 includes a processor 210, a memory 220, and an RF unit 230. The processor 210 implements functions, processes, and/or methods suggested herein. For example, the processor 210 receives flexible subframe configuration information to recognize a flexible subframe among the subframes in the TDD frame. Further, the processor 210 receives the scheduling information for scheduling the flexible subframe to recognize the transmission direction/purpose of the flexible subframe and transmits/receives signals based on the scheduling information. Whether a time gap is included in the flexible subframe may be known by the type information. The memory 220 is connected to the processor 210 and stores various information for driving the processor 210. The RF unit 230 is connected to the processor 210 and transmits and/or receives wireless signals.

The processor 110 or 210 may include an ASIC (application-specific integrated circuit), other chipsets, a logic circuit, a data processing device and/or a converter for performing conversion between a baseband signal and a wireless signal. The memory 120 or 220 may include an ROM (read-only memory), an RAM (random access memory), a flash memory, a memory card, a storage medium and/or other storage devices. The RF unit 130 or 230 may include one or more antennas for transmitting and/or receiving wireless signals. When an embodiment is implemented in software, the above-described schemes may be embodied in modules (processes or functions) for performing the above-described functions. The modules may be stored in the memory 120 or 220 and may be executed by the processor 110 or 210. The memory 120 or 220 may be positioned inside or outside the processor 110 or 210 and may be connected to the processor 110 or 210 via a well-known means.

Although embodiments of the present invention have been described, it will be understood by those of ordinary skill in the art that various changes or modifications may be made thereto without departing from the scope of the present invention defined by the appended claims.

What is claimed is:

1. A method of a terminal transmitting and receiving a signal in a TDD (time division duplex) system, the method comprising:
    receiving, from a base station, scheduling information in a first subframe for scheduling a second subframe;
    receiving a TA (timing advanced) command from the base station, wherein the TA command indicates a time period before which the terminal transmits an uplink signal with respect to an uplink subframe boundary; and
    transmitting or receiving a signal to or from the base station in the second subframe,
    wherein in a case where the scheduling information is a downlink grant for scheduling a downlink data channel, the second subframe is used as a downlink subframe, and in a case where the scheduling information is an uplink grant for scheduling an uplink data channel, the second subframe is used as an uplink subframe,
    wherein in a case where the second subframe is used as the uplink subframe, a PUSCH (physical uplink shared channel) transmitted in the second subframe is transmitted prior to the second subframe boundary by the time period indicated by the TA command, and when transmitted, the PUSCH is punctured by a time gap applied to the second subframe or rate matched, and
    wherein the time gap applied to the second subframe is greater than the time period indicated by the TA command.

2. The method of claim 1, further comprising:
    receiving type information, wherein the type information is information indicating whether a time gap for preventing interference is positioned in the second subframe and informs the terminal of a switch between downlink reception and uplink transmission.

3. The method of claim 2, wherein the type information is included in the scheduling information and is received.

4. The method of claim 2, wherein in a case where the second subframe is used as the downlink subframe, and a subframe subsequent to the second subframe is set as the uplink subframe, the time gap includes a last OFDM (orthogonal frequency division multiplexing) symbol of the second subframe.

5. The method of claim 2, wherein in a case where the second subframe is used as the downlink subframe, and a subframe positioned ahead of the second subframe is set as the uplink subframe, the time gap includes a first OFDM (orthogonal frequency division multiplexing) symbol of the second subframe.

6. The method of claim 2, wherein the time gap is determined on a per-OFDM symbol basis or on a per-multiple OFDM symbols basis.

7. The method of claim 1, further comprising:
    receiving flexible subframe configuration information indicating a flexible subframe in a TDD frame, wherein the flexible subframe configuration information indicates that the second subframe is the flexible subframe.

8. The method of claim 7, wherein flexible subframes indicated by the flexible subframe configuration information each include a time gap.

9. The method of claim 7, wherein the flexible subframe configuration information is received through an RRC (radio resource control) message.

10. The method of claim 1, wherein the scheduling information is received through a PDCCH (physical downlink control channel) of the first subframe.

11. The method of claim 1, wherein in a case where the second subframe is used as the downlink subframe, the terminal does not receive a PDSCH (physical downlink shared channel) in a resource region corresponding to a time gap applied to the second subframe.

12. A terminal comprising:
an RF (radio frequency) unit transmitting and receiving a wireless signal; and
a processor connected to the RF unit,
wherein the processor:
receives, from a base station, type information and scheduling information in a first subframe for scheduling a second subframe,
receives a TA (timing advanced) command from the base station, wherein the TA command indicates a time period before which the terminal transmits an uplink signal with respect to an uplink subframe boundary; and
transmits or receives a signal to/from the base station in the second subframe,
wherein in a case where the scheduling information is a downlink grant for scheduling a downlink data channel, the second subframe is used as a downlink subframe, and in a case where the scheduling information is an uplink grant for scheduling an uplink data channel, the second subframe is used as an uplink subframe,
wherein in a case where the second subframe is used as the uplink subframe, a PUSCH (physical uplink shared channel) transmitted in the second subframe is transmitted prior to the second subframe boundary by the time period indicated by the TA command, and when transmitted, the PUSCH is punctured by a time gap applied to the second subframe or rate matched, and
wherein the time gap applied to the second subframe is greater than the time period indicated by the TA command.

* * * * *